(12) United States Patent
Farghaly et al.

(10) Patent No.: US 12,272,494 B2
(45) Date of Patent: Apr. 8, 2025

(54) BIOFOULING-RESISTANT NANOPOROUS ALLOYS

(71) Applicant: Virginia Commonwealth University, Richmond, VA (US)

(72) Inventors: Ahmed A. Farghaly, Miami, FL (US); Maryanne M. Collinson, Henrico, VA (US)

(73) Assignee: Virginia Commonwealth University, Richmond, VA (US)

( * ) Notice: Subject to any disclaimer, the term of this patent is extended or adjusted under 35 U.S.C. 154(b) by 1166 days.

(21) Appl. No.: 17/054,191

(22) PCT Filed: May 10, 2019

(86) PCT No.: PCT/US2019/031703
§ 371 (c)(1),
(2) Date: Nov. 10, 2020

(87) PCT Pub. No.: WO2019/217805
PCT Pub. Date: Nov. 14, 2019

(65) Prior Publication Data
US 2021/0134535 A1    May 6, 2021

Related U.S. Application Data

(60) Provisional application No. 62/669,510, filed on May 10, 2018.

(51) Int. Cl.
*H01G 11/30* (2013.01)
*B01J 23/42* (2006.01)
(Continued)

(52) U.S. Cl.
CPC .............. *H01G 11/30* (2013.01); *B01J 23/42* (2013.01); *C22C 5/04* (2013.01); *G01N 27/30* (2013.01); *H01M 8/1011* (2013.01)

(58) Field of Classification Search
CPC .............................. H01M 8/1011; B01J 23/42
See application file for complete search history.

(56) References Cited

U.S. PATENT DOCUMENTS

| | | | |
|---|---|---|---|
| 10,654,019 B1 * | 5/2020 | Chaikin | B01J 13/0052 |
| 2009/0297913 A1 * | 12/2009 | Zhang | H01M 4/921 |
| | | | 204/403.01 |
| 2016/0340792 A1 * | 11/2016 | Moffat | C25D 5/605 |

OTHER PUBLICATIONS

Jin, Hai-Jun, et al. "Nanoporous Au—Pt alloys as large strain electrochemical actuators." Nano letters 10.1 (2010): 187-194. (Year: 2010).*

(Continued)

*Primary Examiner* — Sadie White
*Assistant Examiner* — Kayla Elaine Clary
(74) *Attorney, Agent, or Firm* — WCF IP

(57) ABSTRACT

A three-dimensional bicontinuous nanoporous platinum-based (3D-BC—NP—Pt(Au)) electrode is prepared by co-electrodepositing Pt and Ag to form a Pt—Ag alloy thin film on a gold substrate, annealing the Pt—Ag alloy thin film deposited on the gold substrate to produce a Pt—Ag—Au alloy, and dealloying the Pt—Ag—Au alloy by dissolving Ag to produce the nanoporous three-dimensional bicontinuous Pt—Au electrode with or without: hierarchical porosity, cylindrical nanopores, and engineered nano-cracks. Electrodes comprising Pt—Au alloys are also provided.

5 Claims, 13 Drawing Sheets

(51) Int. Cl.
    *C22C 5/04*     (2006.01)
    *G01N 27/30*     (2006.01)
    *H01M 8/1011*     (2016.01)

(56)     References Cited

OTHER PUBLICATIONS

Vega, Adrian A., and Roger C. Newman. "Nanoporous metals fabricated through electrochemical dealloying of Ag—Au—Pt with systematic variation of Au: Pt ratio." Journal of the Electrochemical Society 161.1 (2013): C1. (Year: 2013).*
Snyder, Josh, et al. "Stabilized nanoporous metals by dealloying ternary alloy precursors." Advanced Materials 20.24 (2008): 4883-4886. (Year: 2008).*

* cited by examiner

BIOFOULING-RESISTANT NANOPOROUS ALLOYS

FIELD OF THE INVENTION

The invention is generally related to the production of nanoporous three-dimensional bicontinuous platinum-gold electrodes with or without hierarchical porosity and engineered nano-cracks that may be used as a biofouling-resistant electrochemical sensor and excellent fuel cell catalyst.

BACKGROUND OF THE INVENTION

Nanoporous metals possess an interesting combination of properties owing to their metallic nature and the nanoscale features or the so-called "finite-size effect".[1-3] Among the different types of porous metals, porous platinum nanostructures have received considerable attention particularly in such fields as electrocatalysis and electrochemical biosensing because platinum has a high catalytic activity along with good chemical and mechanical stability.[2, 4-8] A number of different approaches have been developed to fabricate porous platinum nanostructures.[2, 4-8] These approaches have involved the use of templates such as lyotropic liquid crystals,[9-11] silica or polystyrene spheres,[12] porous alumina oxide membranes,[13] and sol-gel assembly of prefabricated metals nanoparticles to produce aerogels.[14-16] Dealloying strategies[17] have also been described starting with electrodeposited Pt—Cu,[18-19] Pt—Si binary alloys,[20-21] Al—Pt—Au alloys,[22] Ag—Au—Pt alloys[23-26] and arc melt mixtures of Pt—Ag.[27]

Although the aforementioned fabrication techniques possess merits, for applications related to electrochemical sensing and electrocatalysis in complex environments, additional factors need to be considered.[2, 8, 28] Such features include a strong adherence to a conducting surface, a stable nanoporous framework, a surfactant-free/pristine metal surface to guarantee efficient electron transfer, a hierarchical and 3D bicontinuous porous structure to improve mass transport, and the ability to facilitate electron transfer with kinetically slow redox couples. Such attributes, for example, cannot be found in many particle-based porous platinum nanostructures[15] prepared by wet chemical approaches. An additional caveat, for electrochemical sensing in complex biological matrices, the electrode needs to exhibit a framework that is in the form of a sieve or porous membrane with pores that are similar in size to the diameter of proteins.[29] Nanoporous gold[29] and mesoporous silica,[30] in particular, have been shown to protect the electrode surface from biofouling. Under these circumstances, a unique sieving-like mechanism is operative whereby small redox molecules can reach inner surfaces to transfer the electrons while large biofouling agents are not able to.[29] Such electrodes have been shown to successfully make electrochemical measurements in complex chemical environments including plasma and blood.[29, 31-32]

SUMMARY OF THE INVENTION

Embodiments of the disclosure provide high surface area 3D bicontinuous nanoporous platinum-gold structures that may be used in a variety of applications such as a catalyst or sensor. Further applications include, but are not limited to, the production of miniaturized sensing devices that can work in complex environments, high efficiency and high current outputs fuel cells, battery-like supercapacitors for military and space applications, flow battery membrane, and automotive catalytic converters (autocatalyst).

An aspect of the present disclosure provides a nanoporous 3D bicontinuous electrode comprising platinum-gold (Pt—Au) alloy. In some embodiments, the nanostructured alloy contains 20-40% Pt. In some embodiments, the nanopores have a size from 10-50 nm. In some embodiments, the nanostructured alloy does not possess hierarchical porosity. In some embodiments, the nanostructured alloy does possess hierarchical porosity, originated from the cylindrical nanopores, with or without engineered nano-cracks. In some embodiments, the nanostructured alloy is biofouling-resistant. In some embodiments, the nanostructured alloy is a highly active catalyst toward the methanol electro-oxidation. In some embodiments, the nanostructured alloy possesses very high and controllable volumetric capacitance. In some embodiments, the nanostructured alloy is able to quantitatively oxidize important bioanalytical reagents such as hydrogen peroxide and glucose. In some embodiments, the nanostructured alloy catalyzes the electro-oxidation of important bioanalytical reagents such as ascorbic acid. In some embodiments, the nanostructured alloy possesses a unique biosieving-like mechanism and demonstrates the ability to operate in a continuous mode (hundreds of measurements) to quantitatively detect electroactive species in complex matrixes including blood products.

Another aspect of the present disclosure provides a method of preparing a nanoporous 3D bicontinuous Pt—Au electrode with or without hierarchical porosity and engineered nano-cracks, comprising the steps of co-electrodepositing Pt and Ag to form a Pt—Ag alloy thin film on a gold substrate, annealing the Pt—Ag alloy thin film to the gold substrate to produce a Pt—Ag—Au alloy, and dealloying the Pt—Ag—Au alloy by dissolving Ag to produce the Pt—Au electrode. In some embodiments, a plating solution for the co-electrodeposition contains $[PtCl_4]^{2-}$ ions. In some embodiments, a plating solution for the co-electrodeposition contains $[Ag(CN)_2]^-$ ions. In some embodiments, the dealloying step is performed in nitric acid. In some embodiments, the amount of Ag remaining in the material is very low while in others it can be higher. In some embodiments, the method is performed in the absence of surfactant, such as octaethylene glycol monohexadecyl ether. In some embodiments, large scale production is achievable, e.g. more than 50 electrodes electrodeposited per day.

bottom line in (c)) and after annealing and dealloying (bottom lines in (a) and (b); bottom line in (c)). The spectra have been offset for clarity.

Figure 6:
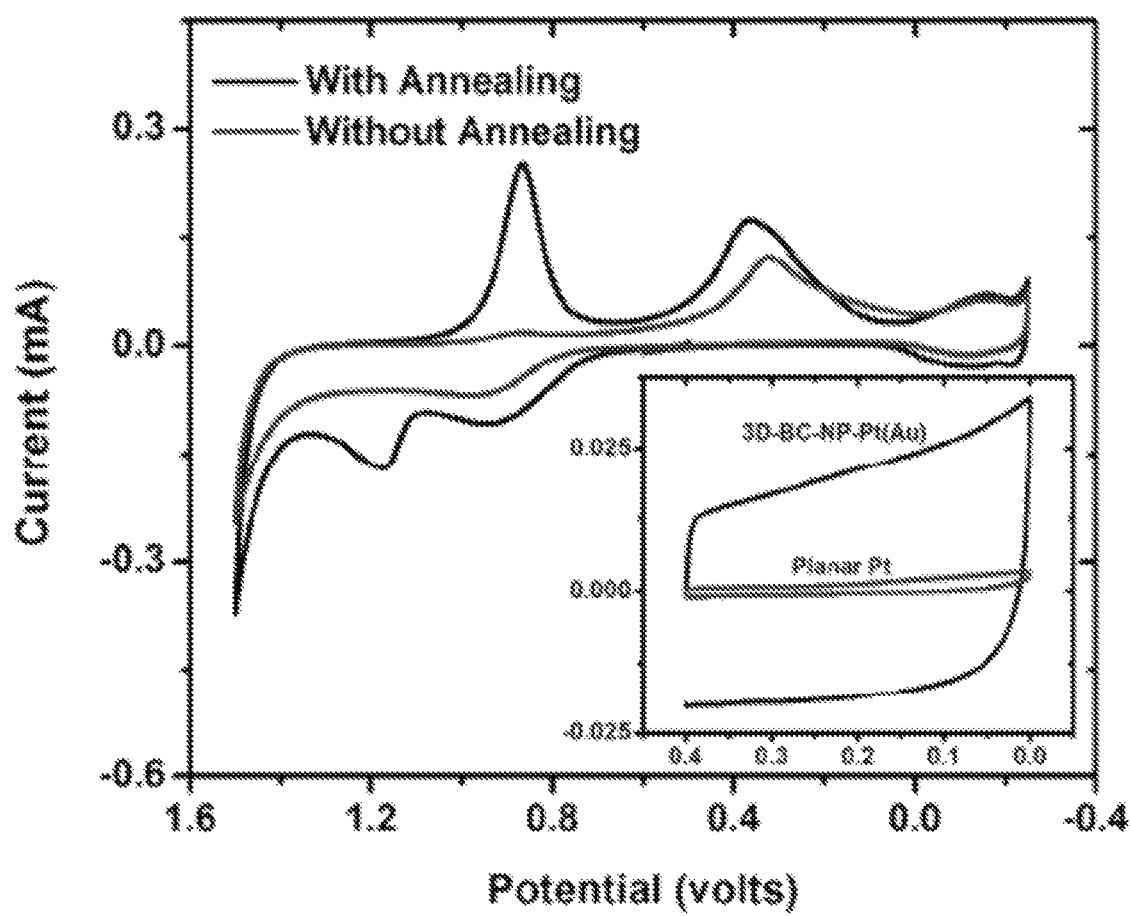

FIG. 6. Cyclic voltammetric (CV) curves of annealed (outer curve) and non-annealed (inner curve) films in 0.5 M $H_2SO_4$ at 50 mV/s. Inset: CVs of 3D-BC—NP—Pt(Au) and planar platinum electrodes in 0.1 M KCl at 100 mV/s.

Figure 7A:
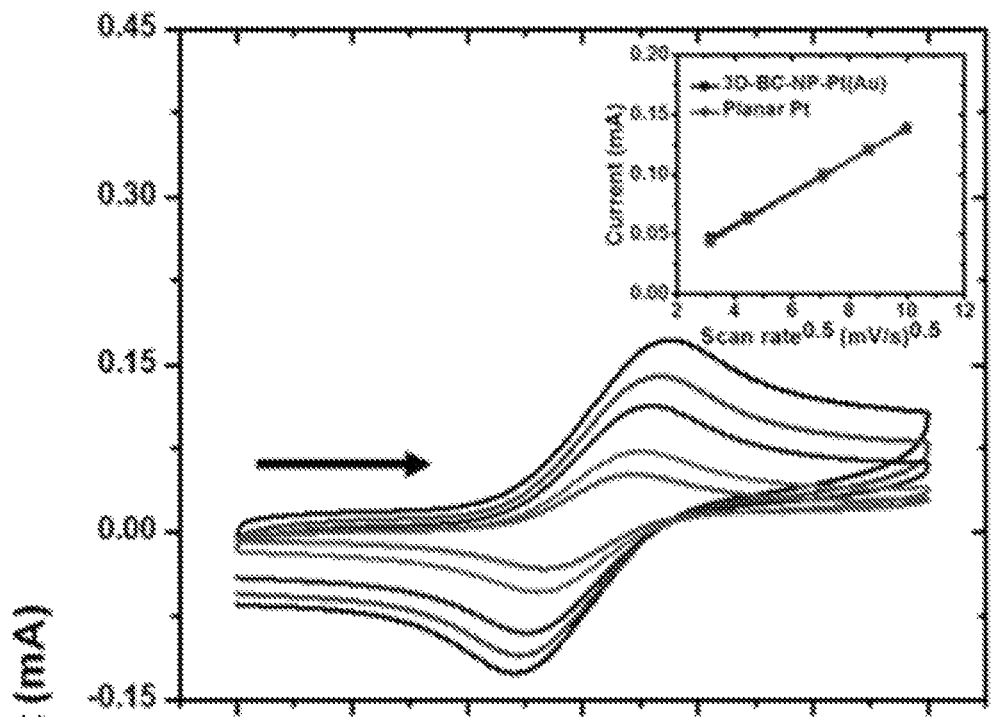
Figure 7B:
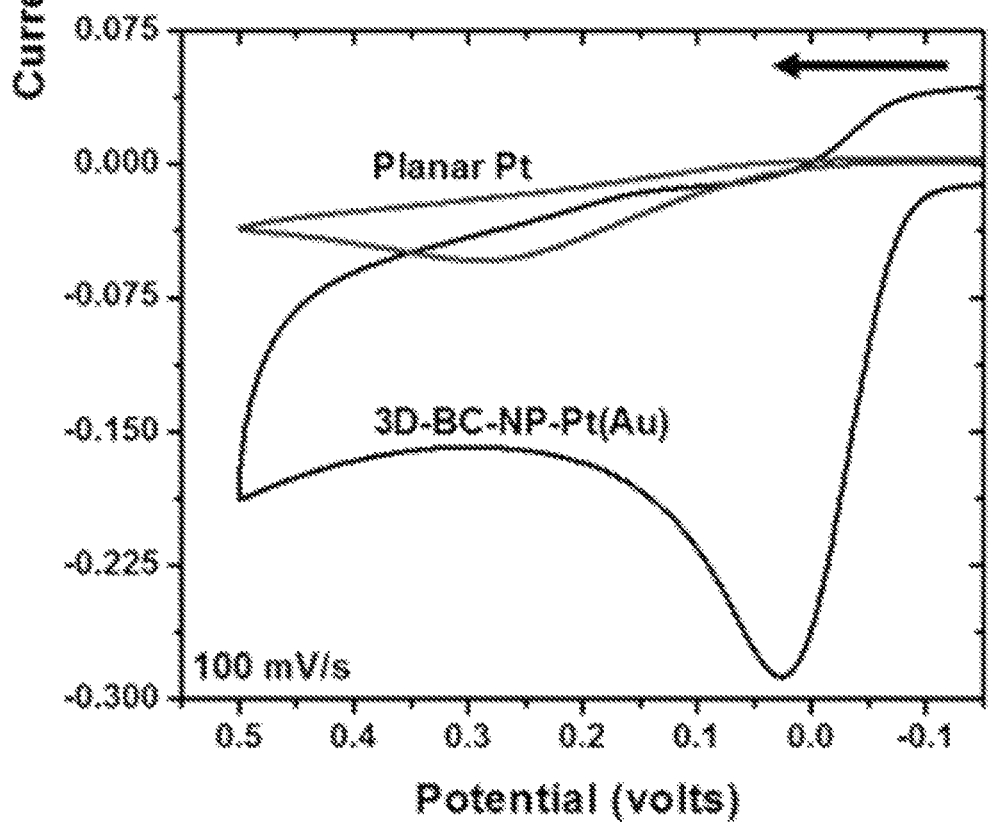

FIGS. 7A-B. Cyclic voltammetric (CV) curves of (a) 10 mM $[Fe(CN)_6]^{3-}$ in 0.1 M KCl and (b) 10 mM ascorbic acid in PBS acquired at a planar platinum and 3D-BC—NP—Pt (Au) electrode (sample A). The inset in (a) is a plot of the peak Faradaic current as a function of the square root of scan rate for $[Fe(CN)_6]^{3-}$.

Figures 8A, 8B:
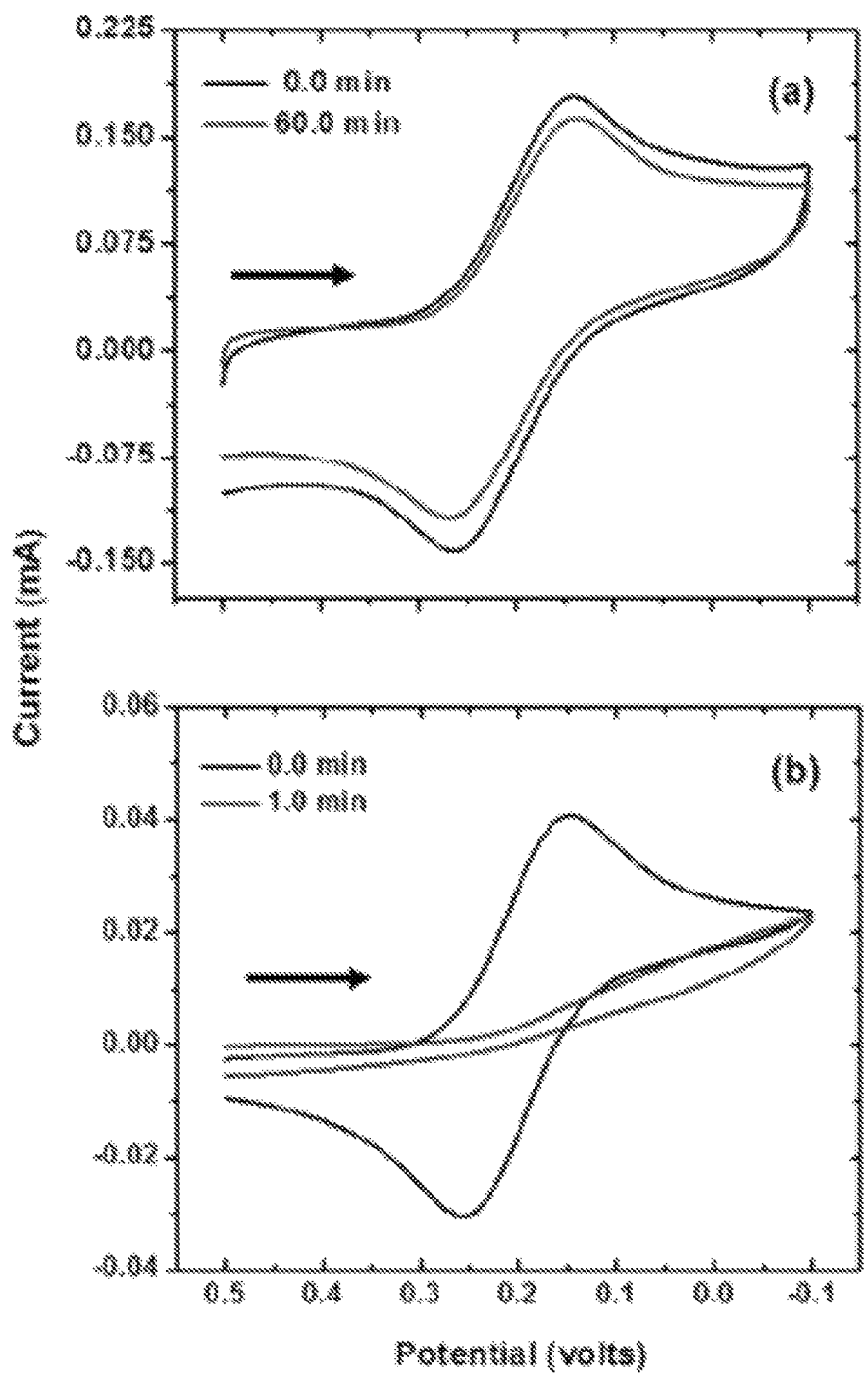

FIGS. 8A-B. Cyclic voltammetric (CV) curves obtained at (a) 3D-BC—NP—Pt (Au) electrode (sample A) and (b) planar platinum electrode in 10 mM $[Fe(CN)_6]^{3-}$ in 0.1 M phosphate buffer (pH 7.4, 0.1 M KCl) before and after addition of bovine fibrinogen (Fn, 1 mg/mL). Scan rate: 100 mV/s. The electrode was incubated for 1 min before collecting the CV.

Figure 9:
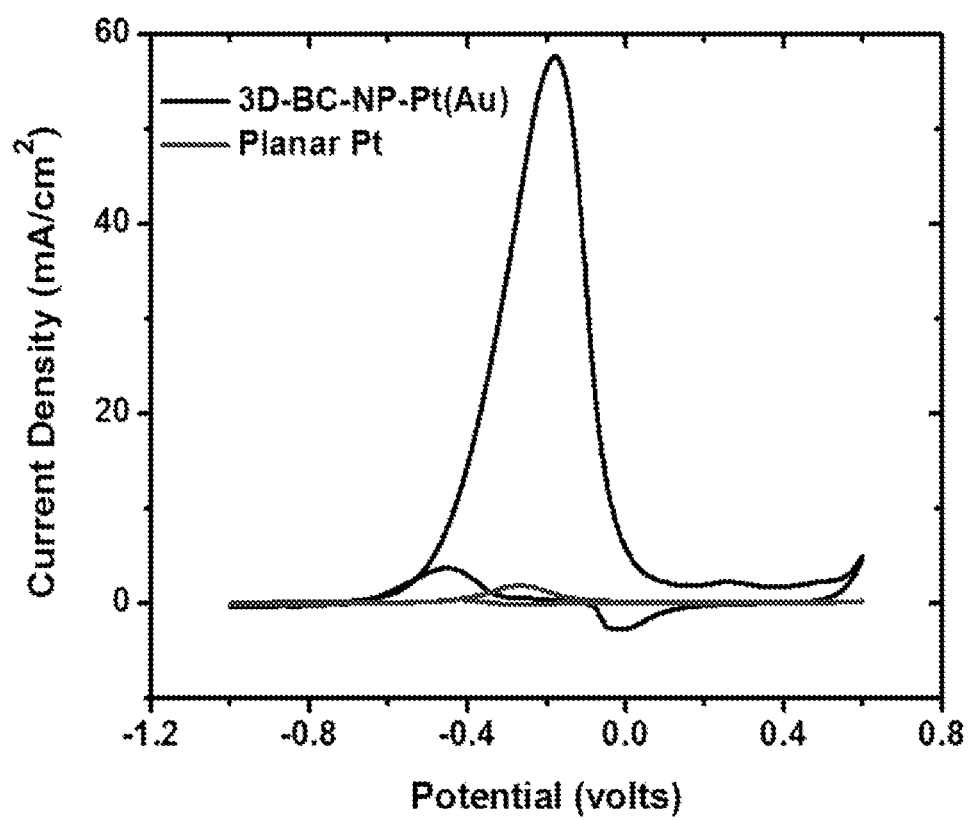

FIG. 9. CV of methanol oxidation obtained at 3D-BC—NP—Pt(Au) (upper curve) and planar platinum (lower curve) in 0.5 M $CH_3OH$ in 1.0 M KOH. Scan rate: 50 mVs. The 3D-BC—NP—Pt(Au) electrodes displayed an exceptionally high catalytic activity toward the oxidation of methanol compared to that obtained on the planar platinum electrode.

Figure 10:
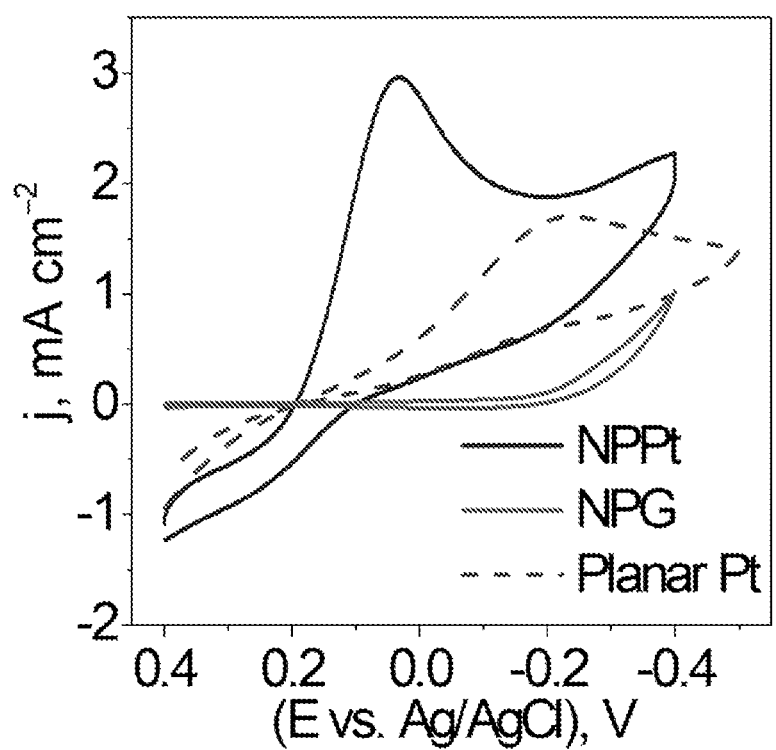

FIG. 10. Cyclic voltammograms obtained for 5.0 mM hydrogen peroxide in 0.1 M PBS (pH 7.4) using planar Pt, 3D-BC—NP—Pt(Au) and nanoporous gold (NPG) electrodes. Scan rate=50 mV/s.

Figures 11A, 11B, 11C:
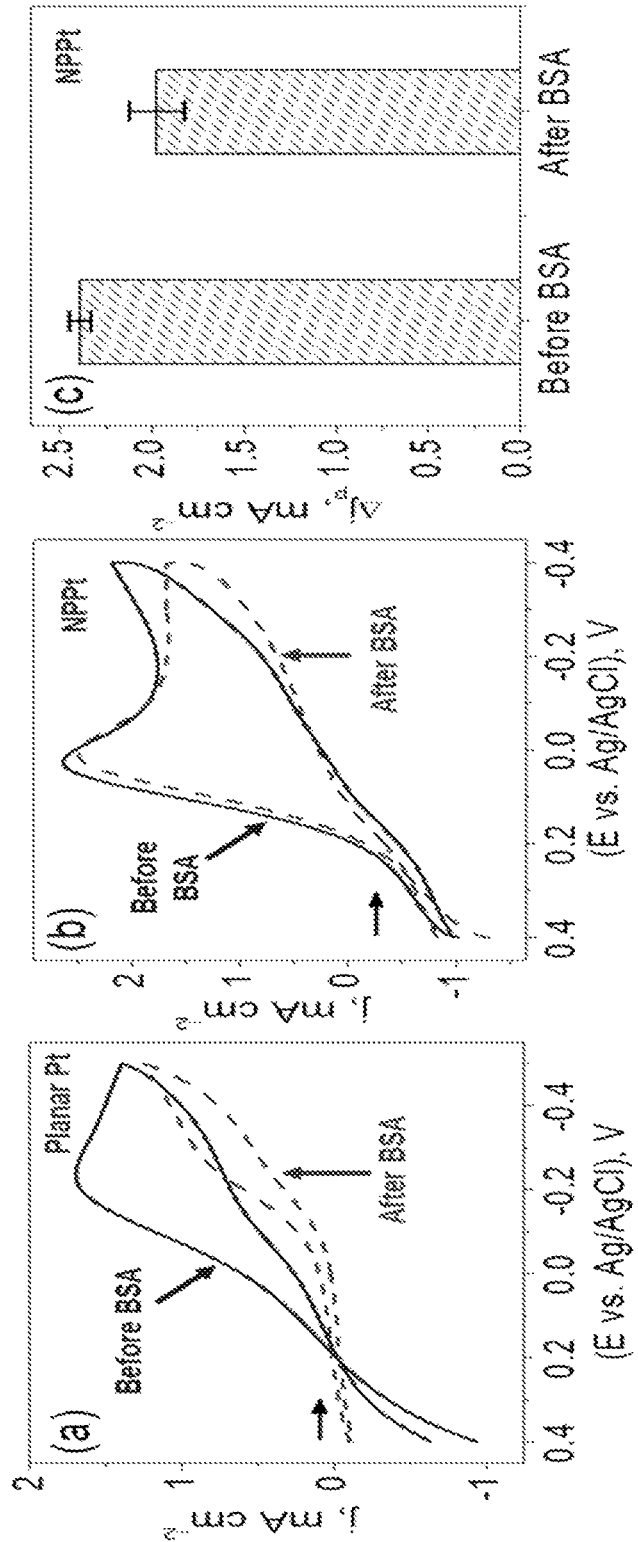

FIGS. 11A-C. Cyclic voltammograms obtained for 5.0 mM hydrogen peroxide in 0.1 M PBS (pH 7.4) before and after 1 h of exposure to bovine serum albumin (BSA; 1 i5 mg/mL) using (a) planar Pt and (b) 3D-BC—NP—Pt(Au) electrodes. Scan rate=50 mV/s. (c) Average current densities recorded for 5.0 mM hydrogen peroxide using 3D-BC—NP—Pt(Au)) before and after exposure to BSA.

Figure 12:
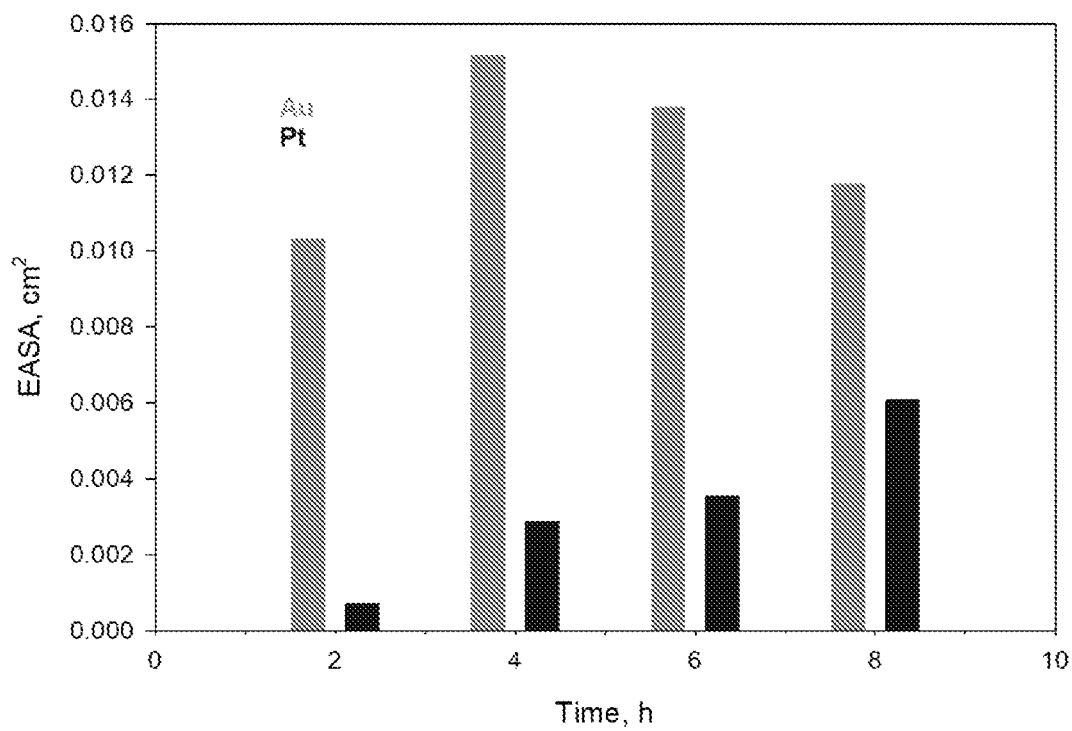

FIG. 12. Electroactive surface area (EASA) for Au (left bars) and Pt (right bars) obtained under Gaussian peak shape from CVs in 0.5 M $H_2SO_4$ on electrodes of 3D-BC—NP—Pt(Au) annealed at 300° C. for different times 2 h, 4 h, 6 h, & 8 h. Scan rate: 100 mV/s.

Figure 13:
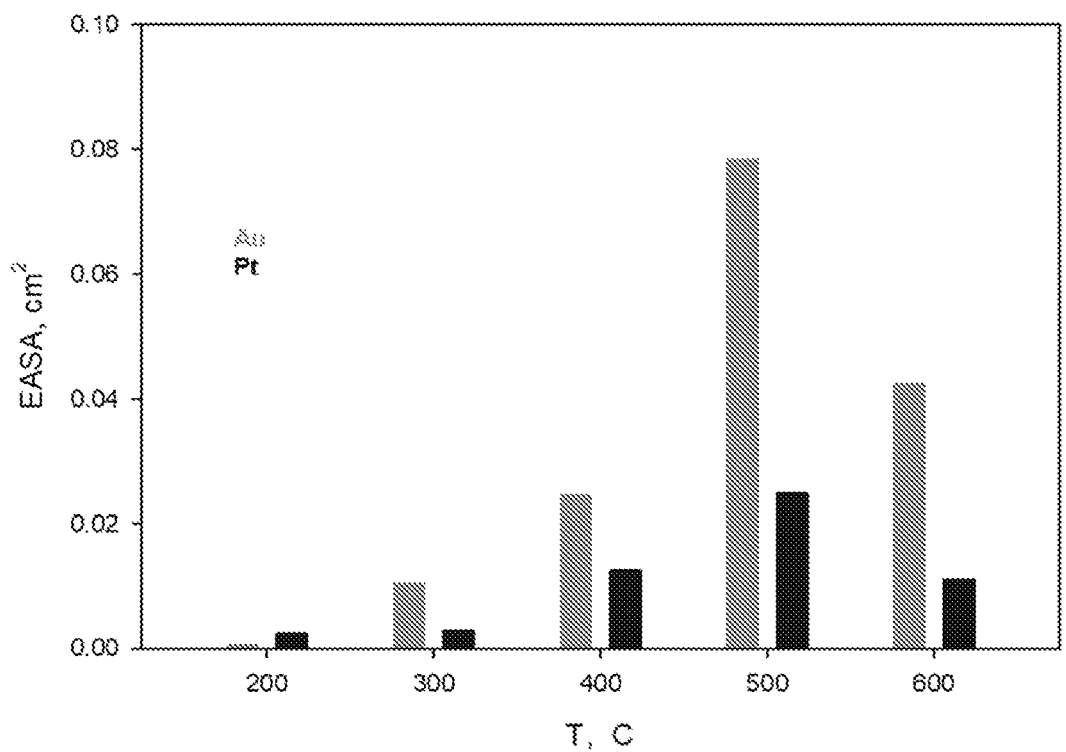

FIG. 13. Electroactive surface area (EASA) for Au (left bars) and Pt (right bars) obtained under Gaussian peak shape from CVs in 0.5 M $H_2SO_4$ on electrodes of 3D-BC—NP—Pt(Au) annealed for 2 h at different temperatures (200° C., 300° C., 400° C., 500° C., 600° C.). Scan rate was 100 mV/s.

Figure 14:
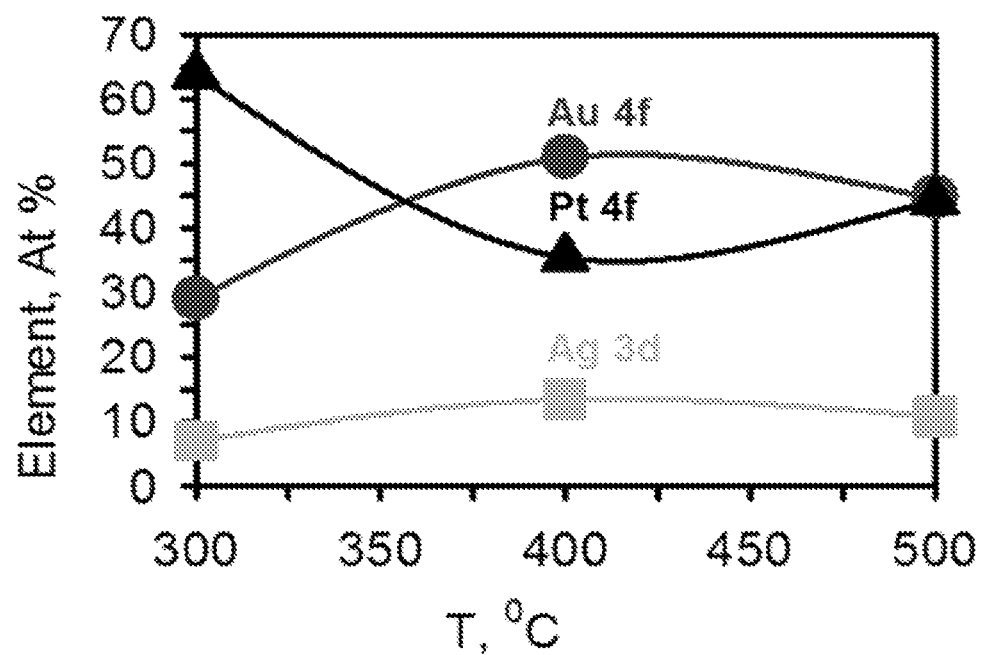

FIG. 14. Average elemental surface composition of 3D-BC—NP—Pt(Au) electrodes annealed for 2 h at different temperatures. Values obtained by XPS.

DETAILED DESCRIPTION

As used herein, the term "bicontinuous" refers to a morphology comprising two interpenetrating phases, wherein each phase is interconnected. By "interpenetrating" is meant that the first phase and the second phase each form networks that are continuous in two or three dimensions and that each phase extends a distance into the other phase. By "interconnected" is meant that each phase itself is continuous. In contrast, a two-phase material containing a primary phase and a secondary phase precipitated within the primary phase is not bicontinuous because the secondary phase is not interconnected. Bicontinuous morphologies can be characterized by the average diameter of the ligaments within each phase. In some bicontinuous structures, the diameters of the ligaments within each phase are approximately the same. Accordingly, this characteristic of the bicontinuous morphology can be referred to by a single number called the "characteristic length scale." For instance, nanoporous gold possesses a 3D bicontinuous structure, one phase of which comprises gold, and the other phase of which is a void whose characteristic length scale can be controlled from about 5 nm to about 1000 nm by varying the relative rate of silver dissolution and gold surface diffusion. A bicontinuous film is substantially smooth and homogenous and would not encompass a film of separate islands, for example, as described in Li et al. (Electrochimica Acta 190 (2016) 852-861).

The term "nanoporous" refers to hollow regions, i.e. pores, within a material having an average internal diameter from 1 nm to 99 nm, e.g. 2-50 nm, 10-50 nm, or 10-30 nm. The pores may be substantially cylindrical.

"Hierarchical porosity" refers to structures having pores within two or more pore length scales, e.g. a structure may include a set of pores with an average diameter between 10-15 nm and a second set of pores with an average diameter between 40-45 nm.

"Three-dimensional" or "3D" refers to a structure having three dimensions that are not confined to the nanoscale range. Such structures are also referred to as "bulk nanomaterials" and possess a nanocrystalline structure and/or involve the presence of features at the nanoscale.

Embodiments of the disclosure provide a surfactant-free and template-free strategy for the electrochemical fabrication of high surface area three-dimensional bicontinuous nanoporous platinum-gold 3D-BC—NP—Pt(Au) alloyed structures for electrocatalysis, energy storage, and electrochemical sensing in complex biological solutions. The incorporation of the Pt—Au alloy is valuable because it has electrocatalytic and electrochemical properties that are better than either Pt or Au alone due to synergy between the elements. The 3D bicontinuous nanoporous platinum-based electrodes provided herein have enhanced mass transport and hierarchical porosity for sensing, catalysis and energy applications. The hierarchical porosity facilitates the electrochemically active ions and molecules transfer at the electrode/electrolyte interface and through the nanoporous network and originates from the presence of nanoengineered cylindrical pores within the 3D bicontinuous nanoporous structure framework. Thus, the electrodes can increase rates of electron transfer of kinetically sluggish redox reactions.

In principle, the preparation of 3D bicontinuous nanoporous Pt-based materials is a challenge for many reasons. The major challenge is the formation of homogenous platinum binary alloy (Pt-M) in which M is less noble and has the same crystal structure as platinum and can easily be removed. Another challenge is the electroless deposition reaction that initiates when platinum ions are in contact with a less noble metal ion (reducing agent). This reaction occurs spontaneously and may convert the Pt-M alloy into pure Pt particles and/or destroy the homogeneity of the binary alloy. The significantly slow electrodeposition rate of Pt with respect to the less noble metal is another challenge. The dependence of the Pt electrodeposition rate on the nature and concentration of the less noble metal ions is also challenging.

Described herein is a relatively simple electrochemical procedure that overcomes these challenges. Embodiments of the disclosure provide a method of preparing a nanoporous three-dimensional bicontinuous Pt—Au electrode with or without hierarchical porosity and engineered nano-cracks, comprising the steps of co-electrodepositing Pt and Ag to form a Pt—Ag alloy thin film on a gold substrate, annealing the Pt—Ag alloy thin film deposited on the gold substrate to produce a Pt—Ag—Au alloy, and dealloying the Pt—Ag—Au alloy by dissolving Ag to produce the Pt—Au electrode.

The plating solution used for co-electrodeposition comprises precursor ions of Pt and Ag. For example, suitable Pt ions include, but are not limited to, $[PtCl_4]^{2-}$, $[Pt(NH_3)_4]^{2+}$, $[Pt(NO_2)_4]^{2-}$, and $[Pt(NO_2)_2(SO_4)]^{2-}$. Suitable Ag ions include, but are not limited to, $[Ag(CN)_2]^-$. The porosity and the overall microstructure of the Pt—Ag material can be readily changed by changing the mole ratio of Pt:Ag in the electroplating solution as shown for example in Table 1.

TABLE 1

Evaluation of electrodeposition solutions.

| Sample notation | Mole ratio Pt | Mole ratio Ag | Dealloyed film thickness (nm) | 3 D Bicontinuous porosity | Hierarchical porosity | Nano-cracks |
|---|---|---|---|---|---|---|
| Sample A | 9.27 | 6.72 | 408 ± 104 | Y | Y | Y |
| Sample B | 9.27 | 3.17 | 297 ± 55 | Y | Y | N |
| Sample C | 9.27 | 2.56 | 286 ± 17 | N | N | N |

N: No;
Y: Yes.

As would be understood in the art, the parameters in Table 1 are exemplary and may be adjusted. For example, other Pt:Ag mole ratios may be used if desired, e.g. Pt:Ag of 8.94:4.08.

After co-electrodeposition, the substrate may be washed several times with DI water to remove excess chemical reagents. The substrate may then be placed in an oven, e.g. at 65° C. for 30 min, followed by annealing at 300° C. for 6 h in a muffle furnace. The temperature and annealing time may be varied to produce bicontinuous nanoporous Pt(Au) with different elemental compositions. In some embodiments, the temperature is from 200-600° C., e.g. 200° C., 300° C., 400° C., 500° C., or 600° C. In some embodiments, the annealing time is 2-8 hours, e.g. 2, 3, 4, 5, 6, 7, or 8 hours. For example, FIG. 12 shows the variation in electroactive surface area for Au and Pt on electrodes of 3D-BC—NP—Pt(Au) annealed at 300° C. for different times. FIG. 13 shows the variation in electroactive surface area for Au and Pt on electrodes of 3D-BC—NP—Pt(Au) annealed for two hours at different temperatures. FIG. 14 provides the average elemental composition of 3D-BC—NP—Pt(Au) electrodes annealed for two hours at different temperatures.

The annealed sample may be dealloyed via electrochemical dealloying, e.g. using sulfuric acid, or by submerging in concentrated or dilute nitric acid. In some embodiments, the annealed sample is dealloyed by submerging in 1:1 DI water:nitric acid.

In some embodiments, the Pt:Ag mole ratio is between about 9.3:2.0 to 9.3:8.0, for example, the Pt:Ag mole ratio may be about 9.3:3.2 or 9.3:6.7. In general, an increased silver content leads to the presence of engineered nano-cracks which improves mass transport of an analyte into or out of the porous metal framework. Nano-cracks may be, for example, 60-90 nm in width.

By controlling the reaction parameters such as the Pt:Ag mole ratio, different 3D bicontinuous nanoporous Pt—Au nanostructures may be prepared including, but not restricted to, crack-free 3D bicontinuous nanoporous Pt thin films (e.g. with a Pt:Ag mole ratio of about 9.3:3.2), nanoporous Pt spheres/crystals (e.g. with a Pt:Ag mole ratio of about 9.3:2.6), and hierarchical nanoporous films having nano-cracks (e.g. with a Pt:Ag mole ratio of about 9.3:6.7).

During the annealing step, gold atoms from the underlying substrate diffuse and mix with the electrodeposited Ag—Pt alloy to form a ternary alloy (Pt—Ag—Au). For example, the elemental surface composition of the annealed film may comprise about 80-90% Ag, 1-10% Au, and 10-20% Pt. When the ternary alloy is immersed in a dealloying agent such as nitric acid, the silver dissolves, the platinum and gold atoms diffuse and restructure leaving behind a 3D bicontinuous nanoporous Pt—Au framework. After dealloying, the chemical composition of the film interface may comprise about 0-20% Ag, 30-60% Au, and 30-70% Pt. Thus, the dealloying process may be incomplete and some residual Ag may remain.

As is understood in the art, porous materials made by a dealloying technique are usually made from an alloy A-B where are A is more noble than B. After the dealloying process, a porous structure from A is obtained. Generally, A will contain small amounts of the less noble component B. However, as is typical in the art, the resulting structure would be is called "nanoporous A". For example, the most common nanoporous metal structure is called "nanoporous gold" and not "nanoporous gold-silver" although it has a small content of silver remaining after dealloying. Thus, it should be understood that any reference to the "Pt—Au" alloy as described herein may contain some residual amount of Ag. In general, the final structure may contain small amounts of Ag embedded and completely covered by Pt—Au which is why Ag peaks were not observed in cyclic voltammograms. In some embodiments, there may be more Pt at the borders. In some embodiments, there may be very fine nanoporous areas or clusters that are pure platinum.

In some embodiments, the alloy possesses high and controllable volumetric and areal capacitances. The capacitance (C, F), areal (Ca, F/cm$^2$) and volumetric capacitances (C, F/cm$^3$) of the 3D-BC—NP—Pt electrodes with Pt:Ag mole ratio of 9.27:6.72 were calculated to be 161 pF, 2000 pF/cm$^2$ and 400 F/cm$^3$ from the cyclic voltammograms in 0.1 M KCl according to the equation:

$$C_x = \frac{\int_{v_1}^{v_n} IdV}{Xv * \Delta V}$$

where x is 1.0, geometric area or volume of the 3D-BC—NP—Pt electrode, v is the scan rate (V/s), $\Delta V$ is the potential window for the CV measurement and $\int_{v_1}^{v_n} IdV$ is the integration of the cyclic voltammetry curve. The high volumetric capacitance of the 3D-BC—NP—Pt electrode gets back to its high surface area.

Further embodiments of the disclosure provide a nanoporous 3D bicontinuous electrode comprising a Pt—Au alloy prepared by a method as disclosed herein. Due to the geometric arrangement of nanopores (i.e. a continuous array with diameters in the 10's nanometer range), the surface can act like a biosieving membrane and allow for efficient electron transfer between a redox species in solution and the electrode surface even in the presence of biofouling agents.

Biofouling may be caused by one or more materials present in an aqueous media with complex matrices (e.g. blood, serum, etc.) such as dissolved species, colloidal species, suspended matter, surfactants or surfactant-like chemicals, microbiological entities such as proteins, and the like. Known biofouling agents include bovine serum albumin (BSA), fibrinogen, immunoglobin, blood cells, algae and bacteria. The presence of biofouling agents can lead to surface passivation. In some embodiments, the electrode of the disclosure is biofouling-resistant. "Biofouling-resistant" refers to the ability of an electrode to resist surface passivation and make electrochemical measurements in the presence of a biofouling agent. In some embodiments, a biofouling-resistant electrode maintains at least 50% of its current density in the presence of a biofouling agent, e.g. at least 60%, 70%, 80%, 90%, 91%, 92%, 93%, 94%, 95%, 96%, 97%, 98%, or 99% of its current density. In some embodiments, the pore size is engineered such that biofouling agents are excluded, e.g. pore size is similar or smaller than the biofouling agents' size.

The 3D bicontinuous nanoporous electrode as described herein is an extraordinary potent catalyst and sensor with a high and controllable surface area which is useful in production of miniaturized electrochemical sensing and biosensing devices that can work in complex environments, e.g. for the measurement of chemical and biological analytes such as as hydrogen peroxide and glucose in complex biofouling environments.

Further applications include use in high efficiency high power/current outputs fuel cells, measurement of oxidation-reduction potentials (ORP) in complex systems such as blood and blood products and environmental samples (lake water, soil, etc.), as membrane in flow batteries, and as an interface film in nanobonding technology and in heat transfer technology. Additional energy applications include oxygen reduction reactions, alcohol electro-oxidation, and automotive catalytic converters (autocatalyst) in a vehicle's exhaust line to convert the toxic exhaust gases (CO, $HC_x$, and $NO_x$) into less toxic and eco-friendly ones ($CO_2$, water and nitrogen). The high volumetric capacitance of the developed structures make them useful electrodes for ultra-fast and ultra-thin battery-like supercapacitors for military and space applications.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE 1

Summary

A new electrosynthetic approach for the fabrication of three-dimensional bicontinuous nanoporous platinum-based (3D-BC—NP—Pt(Au)) electrodes is described. Electrochemically assisted deposition was used to form Pt—Ag binary alloy thin films on gold substrates. Following annealing and dealloying, scanning electron microscopy (SEM) images revealed an interesting and distinctive nanoporous gold-like microstructure with pores and ligaments in the 10-30 nm range arranged in a bicontinuous fashion throughout the thickness of the film. Both the morphology, porosity, and chemical composition of the 3D-BC—NP—Pt(Au) thin films were fine-tuned by tailoring the electrodeposition reaction parameters. X-ray photoelectron spectroscopy (XPS) confirmed that the as-formed electrodeposited films were initially silver-rich platinum binary alloys. Interestingly, XPS also indicated that after annealing and dealloying, the electrodes were actually ternary alloys containing platinum, gold, and a small amount of residual silver that remains after dealloying. Electrochemical measurements were consistent with this result and also disclosed a high surface area and the ability to successfully make electrochemical measurements in biofouling solutions via a unique biosieving-like mechanism. The work described herein will enrich the fields of electrochemical sensing and biosensing via introduction of new 3D bicontinuous nanostructured porous platinum-based electrodes that can be easily and reliably fabricated.

Materials and Methods

Fabrication of 3D-BC—NP—Pt(Au). Pt—Ag binary alloy thin films were co-electrodeposited on clean gold working electrodes from solutions containing defined amounts of platinum ($[PtCl_4]^{2-}$) and silver ($[Ag(CN)_2]^-$). Electrodeposition was performed at ~1.0 volt vs a silver chloride coated silver wire reference electrode after which they were rinsed with copious amounts of deionized water, dried and annealed in a furnace. To dealloy, the annealed electrodeposited films were immersed in 1:1 nitric acid. The resulting porous electrodes were immersed in deionized water to remove any trace amounts of nitric acid from the evolved porous platinum networks.

Characterization. The surface morphology and bulk composition of the electrodeposited materials before and after dealloying were investigated using a HITACHI SU-70 field-emission scanning electron microscope (FE-SEM) equipped with an energy dispersive X-ray spectrometer (EDS). The surface composition was evaluated by X-ray photoelectron spectroscopy (XPS) using a ThermoFisher ESCALAB™ 250 imaging X-ray photoelectron spectrometer using a monochromatic Al $K_\alpha$ (1486.68 eV) X-ray source equipped with a hemispherical analyzer. An internal flood gun (2 eV) and a low-energy $Ar^+$ external flood gun were used for charge compensation during the data collection. The spectra were corrected using the C 1s peak at 284.6 eV. Thicknesses were measured from cross-sectional SEM images. Electrochemical measurements were performed at room temperature in a 3-electrode one-chamber electrochemical cell equipped with a platinum wire auxiliary electrode and silver-silver chloride reference electrode. For all the electrochemical measurements, the area of the working electrode was 0.0792 $cm^2$ as defined by utilizing a ⅛ in. circle punched in a rectangular piece of tape. The planar Pt electrodes (d=1.7 mm) were cleaned by polishing with 0.5 μm alumina suspension on a napless cloth (Buehler) followed by rinsing, sonication, and plasma cleaning in an $O_2$ plasma.

Results and Discussion

Figure 1:
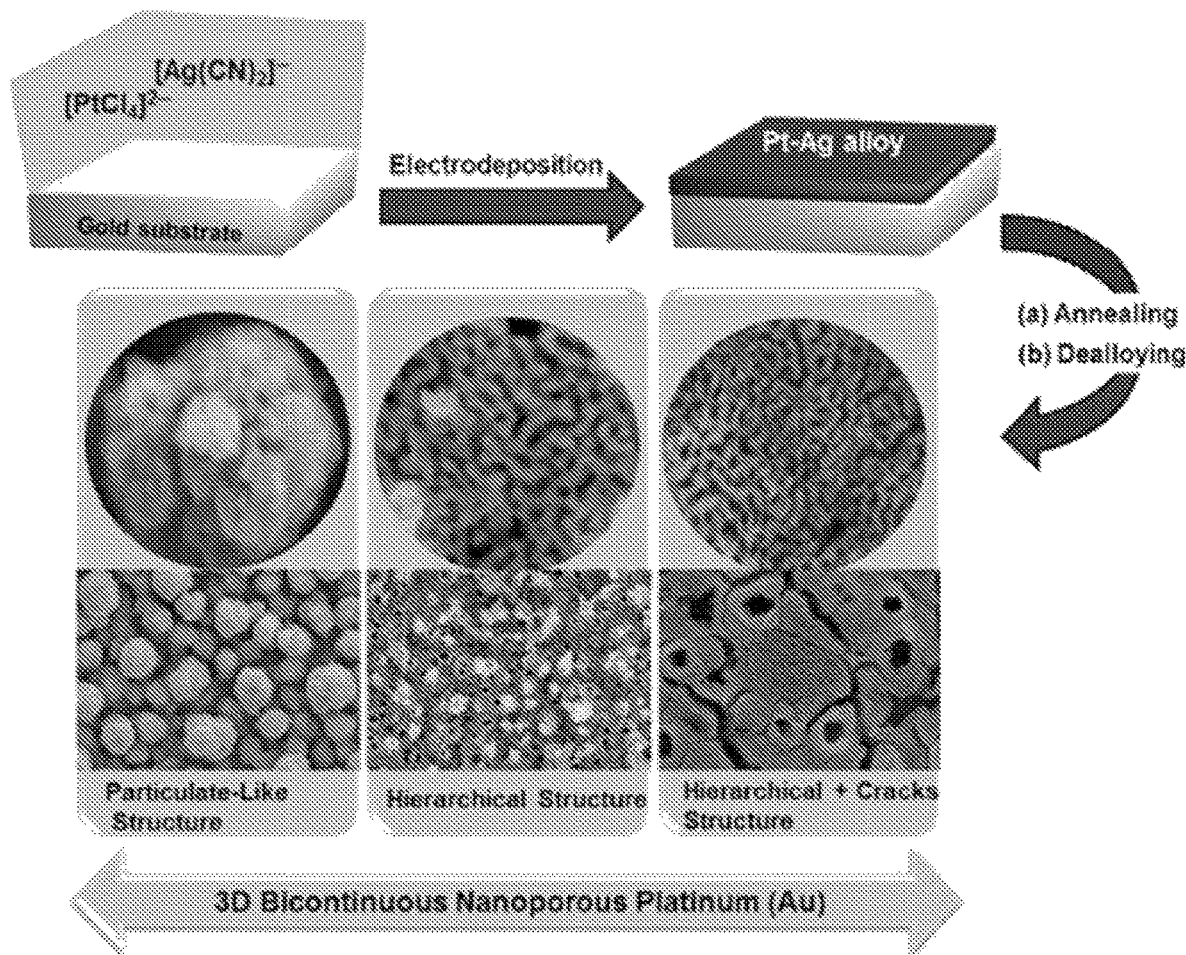
FIG. 1. Schematic illustration (not drawn to scale) of the fabrication of three-dimensional bicontinuous nanoporous platinum (3D-BC—NP—Pt(Au)) structures through chemical dealloying of the co-electrodeposited Pt—Ag binary alloy thin films.

Overview. The electrosynthetic strategy used to prepare 3D-BC—NP—Pt(Au) electrodes is outlined in FIG. 1. The procedure is composed of two main steps: (a) co-electrodeposition of a silver (Ag) rich platinum (Pt) binary alloy (Pt—Ag) thin film and (b) chemical dealloying of the electrodeposited and annealed Pt—Ag alloy thin films in nitric acid. For this approach to be successful, however, several challenges must be overcome. The first lies in the preparation of a Pt—Ag binary alloy thin film of proper composition as dealloying is only possible within a narrow compositional range. Outside this range and at a high percentage of the more noble metal, the complete dissolution of the less noble alloy component is impossible and random pores rather than a 3D bicontinuous porous structure is obtained.[28, 34] At low concentrations, formation of microscopic cracks or complete destruction of the resulting porous framework becomes problematical.[35]

Although Pt—Ag binary alloys are suitable candidates for the formation of porous platinum structures,[27] the simultaneous electrodeposition of Pt and Ag is problematic. The rate of Ag electrodeposition is much faster than that of platinum and thus a high degree of control over the electrodeposition reaction parameters and plating solution composition is required to deposit Pt—Ag alloy of a desired composition.[36] Due to the chemical nobility and high reduction potential (+1.2 volts) of platinum, its simple salts are not very stable and often stabilized through the formation of coordination compounds such as the square planer $[PtC_4]^{2-}$ complex ion. There is a need to shift the reduction potential of platinum precursors to a more negative potential to avoid or minify the spontaneous galvanic displacement reaction in the presence of $Ag^0$ and this could be achieved by choosing a proper platinum complex.[36-37] Electrodeposition of platinum thin films are usually carried out from plating solutions containing chloride-, borate- or phosphate-based supporting electrolytes.[36] These electrolytes react with $Ag^+$ ions forming white (AgCl or $AgBO_2$) or yellow ($Ag_3PO_4$) precipitates and this hinders the electrodeposition of Ag and so prevent the formation/co-electrodeposition of Pt—Ag binary alloy. Careful experimental examination of the Pt—Ag electrodeposition (e.g. testing different precursors and different supporting electrolytes) and understanding the silver coordination chemistry led to the finding that dicyanoargentate linear complex ion $[Ag(CN)_2]^-$ with a formation constant of 5.6× $10^{18}$ can be stable[38] in such environments and both Pt and Ag can simultaneously electrodeposited from a plating solution containing $[PtCl_4]^{2-}$ and $[Ag(CN)_2]^-$ complex ions.

Figure 2A:
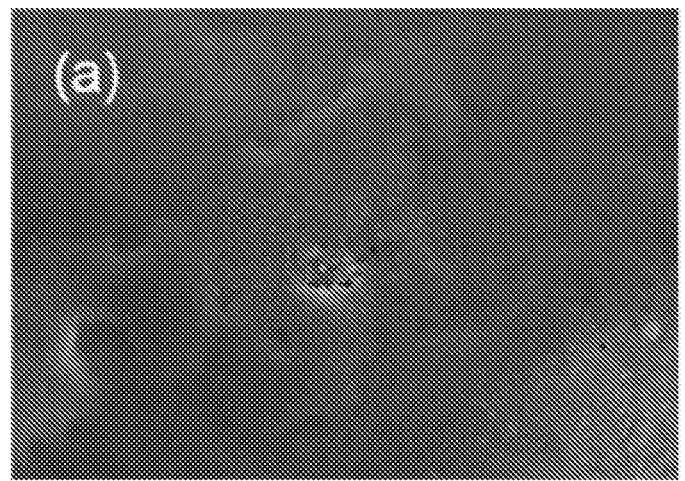
FIGS. 2A-C. SEM micrographs of (a) Pt—Ag binary alloy film prior to dealloying and (b, c) after dealloying in nitric acid. The 3D bicontinuous nanoporous structure is most evident in the high magnification image (c).
Figure 2B:
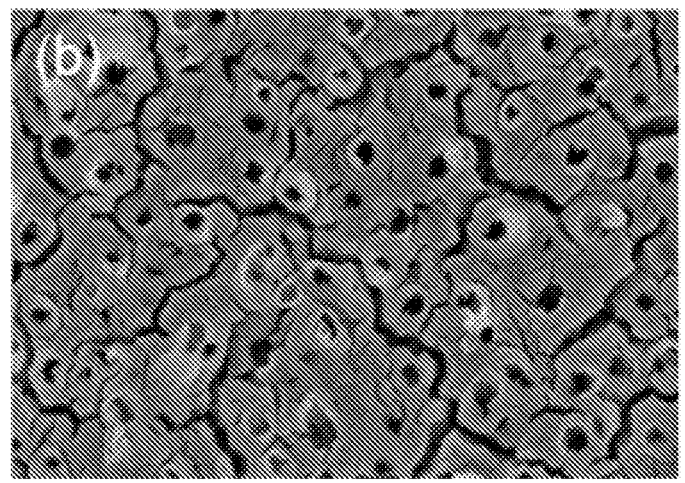
Figure 2C:
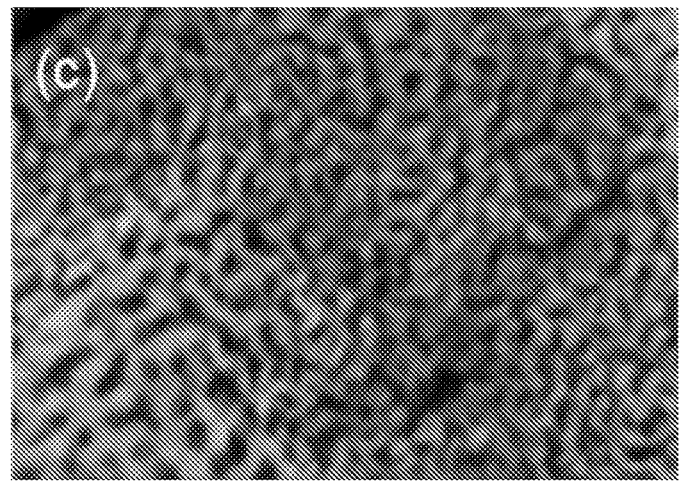
Figures 3A, 3B:
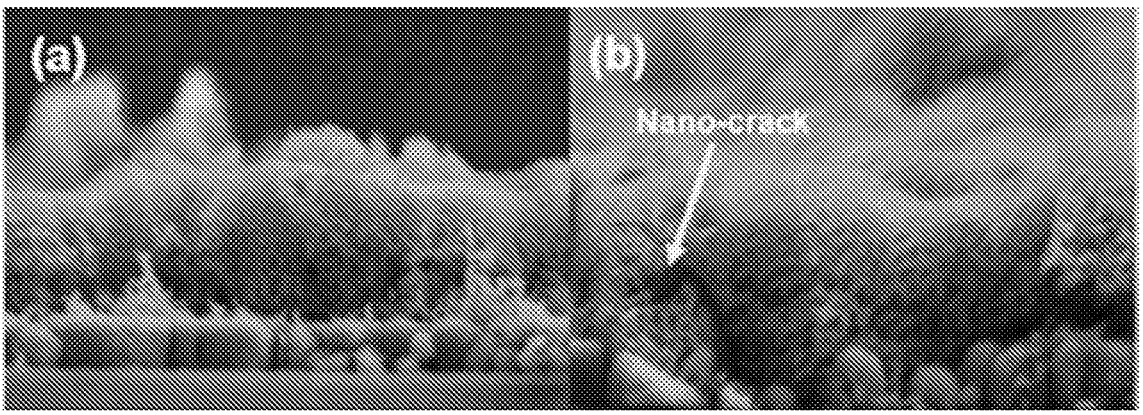
FIGS. 3A-D. Cross-sectional SEM images of the hierarchical 3D-BC—NP—Pt(Au) 1o film with nano-cracks. The preservation of the bicontinuous porous microstructural features throughout the film thickness is demonstrated.
Figures 3C, 3D:
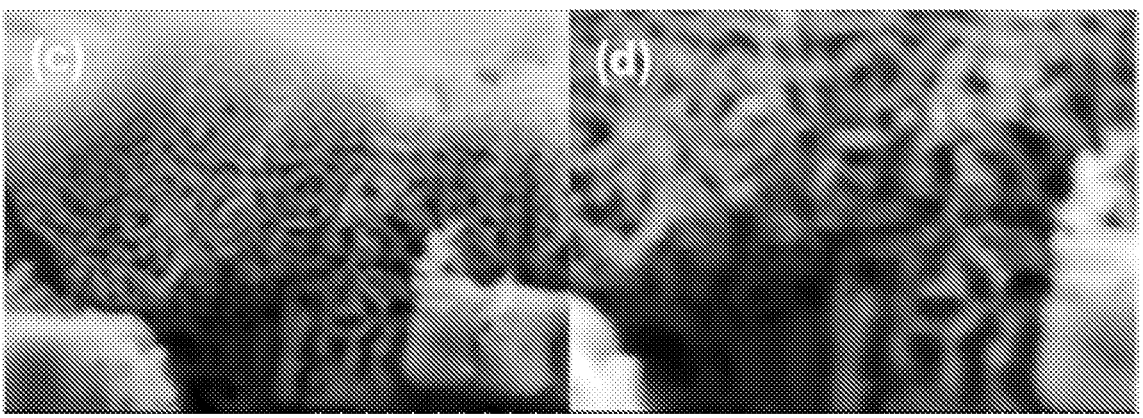

Microscopic Characterization. FIG. 2 displays SEM images of electrodeposited and annealed Pt—Ag binary alloy thin films before (FIG. 2A) and after dealloying (FIGS. 2B and 2C) from an electroplating solution composed of Pt:Ag mole ratio of 9.3:6.7 (sample A). As can been seen, the electrodeposited and annealed Pt—Ag binary alloy thin film is non-porous. Exposure to nitric acid leads to selective dissolution of silver followed by rearrangement of the remaining metal atoms to yield a 3D bicontinuous nanoporous metal framework (FIG. 2C).

The microstructure of these films shows cracks~82 nm in width and large semi-circular pores that are 98.6 nm in diameter. The presence of these nano-cracks and voids is advantageous because it improves mass transport of an analyte into or out of the porous metal framework.[39] The median size of the small pores and ligaments composing the 3D bicontinuous nanoporous structure are 8.9 and 8.3 nm, respectively. The nano-cracks formation is assigned to the stress, and volume contraction during the construction of the brittle continuous porous metal structure from a relatively thick alloy film placed in a corrosive medium.[39-40] The high magnification crosssectional SEM images shown in FIGS. 3A-D provide an estimate of the film thickness (400 nm) and further demonstrate that the microstructural features are maintained throughout the film thickness and confirm the formation of a 3D bicontinuous porous framework.

The porosity and the overall microstructure of the platinum material can be readily changed by changing the mole ratio of Pt:Ag in the electroplating solution (Table 2).

TABLE 2

Samples prepared in this work

| Sample notation | Mole ratio Pt | Mole ratio Ag | Dealloyed film thickness (nm) | 3 D Bicontinuous porosity | Hierarchical porosity | Nano-cracks |
|---|---|---|---|---|---|---|
| Sample A | 9.27 | 6.72 | 408 ± 104 | Y | Y | Y |
| Sample B | 9.27 | 3.17 | 297 ± 55 | Y | Y | N |
| Sample C | 9.27 | 2.56 | 286 ± 17 | N | N | N |

N: No;
Y: Yes.

Figures 4A, 4E:
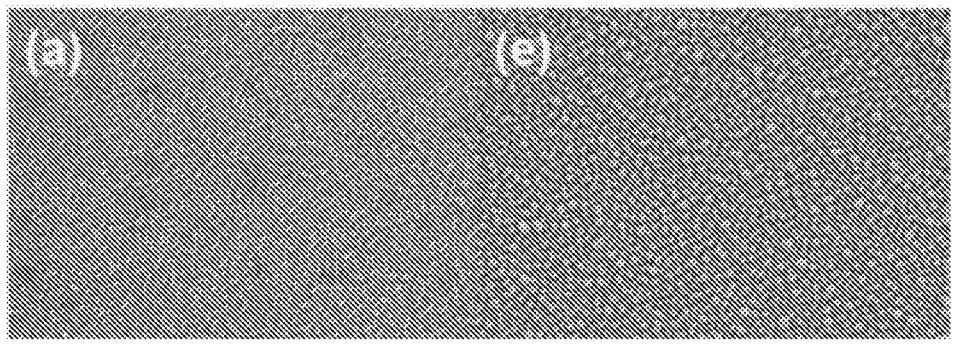
FIGS. 4A-H. SEM micrographs of nanoporous platinum films prepared from plating solutions containing a Pt:Ag mole ratio of (a-d) 9.3:3.2 and 9.3:2.6 (e-h).
Figures 4B, 4F:
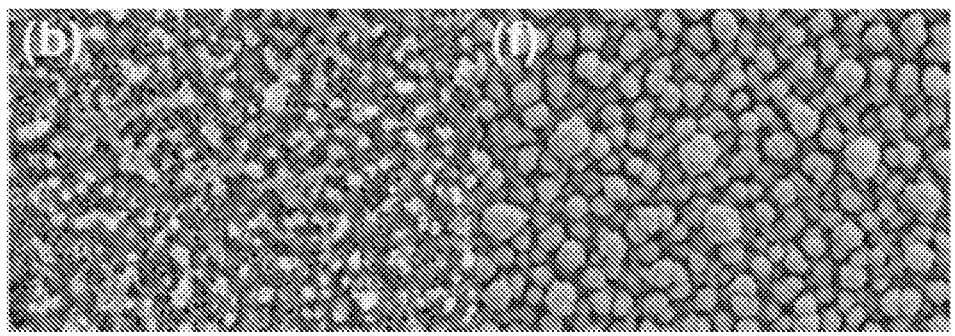

Crack-free 3D bicontinuous nanoporous structures are formed when the concentration of silver in the electroplating solution is decreased to half of its original value (Pt:Ag of 9.3:3.2). At low magnification (FIG. 4A), the films (sample B, Table 2) are porous, crack-free and characterized by the presence of islands/clusters at the film interface. Under high SEM magnification (FIG. 4B-D), the formation of a 3D bicontinuous microstructure with hierarchical porosity is evident. The metallic framework is composed of multimodal pores: (a) large semi-circular pores of median size 42.4 nm; the presence of such pores is advantageous and leads to an enhanced mass transport through the 3D bicontinuous framework (b) medium size bicontinuous pores with a median diameter and ligaments size of 11.8 and 11.25 nm, respectively and (c) small pores within the platinum clusters of 5.7 nm diameters. The medium size bicontinuous pores are the dominant pore-type and all the pores are within the mesopore size range of 2-50 nm. The thickness of the porous film as revealed by the cross-sectional SEM imaging is 297+/−55 nm.

Figures 4C, 4G:
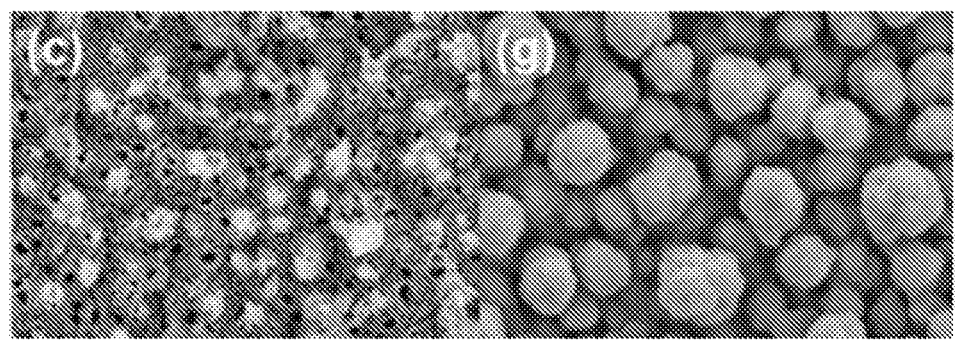
Figures 4D, 4H:
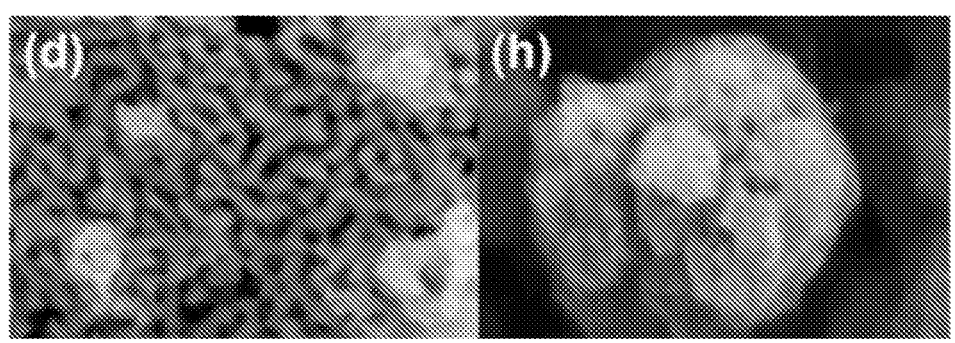

When the silver content in the plating solution is further decreased (Pt:Ag mole ratio of 9.3:2.6), the dealloyed film (sample C, Table 2) is crack-free, porous and particulate in nature as depicted in FIG. 4E-H. The mesoporous nature of the dealloyed film is most evident in the high magnification SEM images (FIG. 4G-H). The large particles at the upper interface contain a large number of mesopores; the smaller particles underneath are arranged and connected so that a mesopore-rich rough blanket with some macropores is formed. The formation of a 3D bicontinuous porous platinum structure was not very pronounced in this film.

Figure 5A:
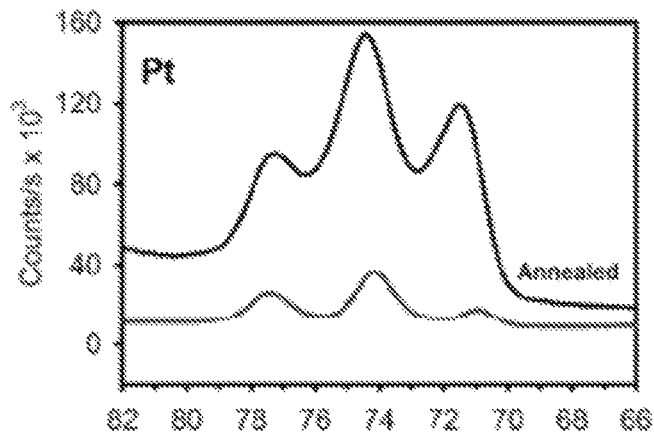
FIGS. 5A-C. High resolution XPS spectra of Pt (a), Ag (b), and Au (c) after is annealing (top lines in (a) and (b)
Figure 5B:
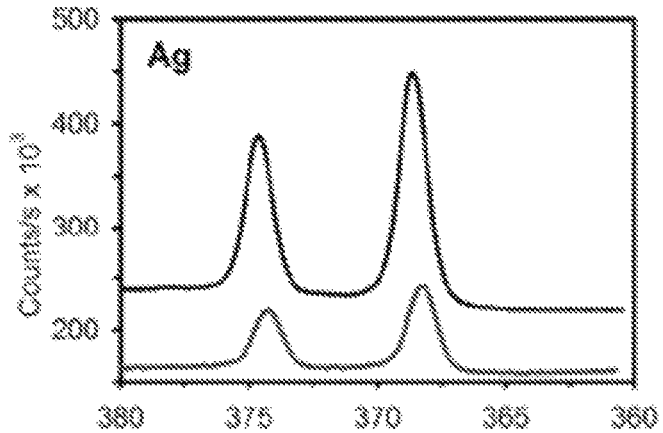
Figure 5C:
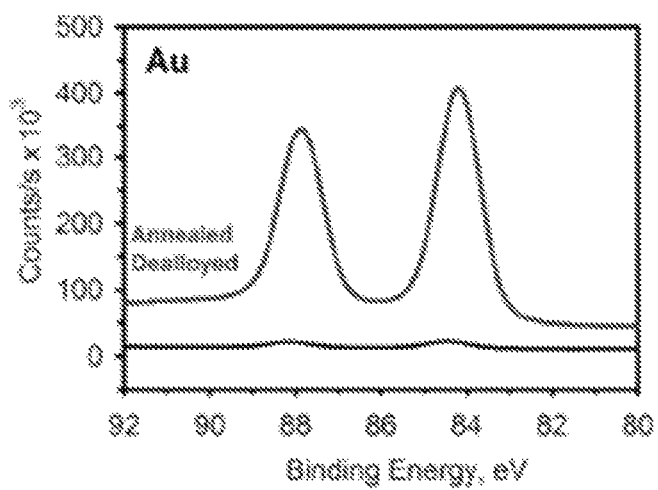

The chemical composition of the films (sample A and B) and the efficiency of the dealloying strategy were evaluated by both EDS and XPS measurements. EDS spectra of the electrodeposited Pt—Ag binary alloy film (sample A) reveal a silver-rich platinum alloy. After dealloying, the silver disappears. To obtain more detailed information about the chemical composition at the interface, XPS measurements were undertaken. FIGS. 5A-C show the high resolution core-level Ag 3d, Pt 4f, and Au 4f XPS spectra of annealed films before and after dealloying in nitric acid. The Ag and Au appear as doublets due to the spin orbit coupling with peak separations of 6.0 and 3.3 eV, respectively.[41-42] The peak separation did not change after the dealloying process.

For the annealed samples, three clear peaks with binding energies of 74.16, 71.0, and 77.37 eV can be noted in the Pt high resolution XPS spectra. After dealloying, the two lower binding energy peaks shift slightly to more positive binding energies (74.31, 71.38, and 77.32 eV) and their relative amounts change. The two oxidations states of Pt most evident in these films are $Pt^0$ and $Pt^{IV}$ and their relative amounts change before and after dealloying the annealed film. The $Pt^0$ appears as a doublet at 70.7 and 74.0 eV and the $Pt^{4+}$ doublet appears at 77.5 and 74.2 eV.[41] A small amount of $Pt^{2+}$ is also likely present; this doublet will appear at 73.4 and 76.6 eV and represents a minor constituent in the films.[41]

Using Wagner sensitivity factors, the elemental surface composition of the annealed film is 84% Ag, 3% Au, and 13% Pt. After dealloying, the chemical composition at the film interface significantly changes (FIG. 5B). The Ag drops to 14% while Au and Pt increase to 52% and 34%, respectively. The presence of such a high percentage of gold in the annealed and dealloyed film was a surprise. Given the film is ~400 nm thick, it is highly unlikely that XPS is detecting the underlying gold substrate. Rather the gold is believed to originate from the underlying gold substrate that diffuses into the film during the annealing (mainly) and dealloying processes and mixes with the platinum and silver. XPS spectra acquired on an electrodeposited film that was neither annealed or dealloyed did not display any gold peaks, which demonstrates a null content of gold.

It is well known that gold atoms exhibit a fast surface diffusion coefficient and this fast diffusion is very important to the formation of the unique 3D bicontinuous microstructure of nanoporous gold and its coarsening.[17-43] The surface diffusivity of Pt is orders of magnitude slower than gold.[43] It has also been shown that Pt, when added to Au—Ag alloy, can stabilize the morphology of nanoporous gold leading smaller pores sizes (less than 5 nm) upon dealloying.[23-24] To validate the hypothesis that diffusion and mixing of platinum, silver and gold atoms during the annealing process is essential for the 3D bicontinuous porous nanostructure formation as revealed by the change in Pt, Ag and Au XPS peaks intensity after annealing, SEM images were acquired of an unannealed and an annealed electrodeposited Pt:Ag binary alloy films after dealloying. The 3D bicontinuous nanoporous structure is only evident in the annealed and dealloyed structure indicative of the importance of annealing.

Electrochemical Characterization. Additional evidence that gold blends with platinum during the annealing process comes from cyclic voltammetric (CV) experiments. A representative CV of 3D-BC—NP—Pt(Au) electrode acquired in 0.5 M $H_2SO_4$ at 50 mV/s is shown in FIG. 6. The CV shows the gold oxide reduction peak at ~0.9 V and hydrogen adsorption/desorption peaks near −0.15 V characteristic of gold and platinum, respectively. The presence of both these peaks indicates that Au and Pt are present in the film, consistent with the XPS results. Without annealing, the CV displays only Pt peaks indicative that diffusion and rearrangement of gold substrate atoms occur during the annealing (mainly) and dealloying processes.

The total charge associated with the hydrogen adsorption peaks near −0.15 volts can be used to estimate the surface area of the Pt. Using a conversion factor of 210 $\mu C/cm^2$,[44] the electrochemically active surface area was 15 times larger than that of a planar platinum electrode. Similarly, by integrating the area under the gold oxide peak at 0.9 V and using a conversion factor of 400 μC/cm$^2$, it was 24 times higher than the geometric area of the electrode. The observed significant enhancement in the surface area of the 3D-BC—NP—Pt(Au) electrode is attributed to the presence of a large population of nanopores in the 3D bicontinuous framework. Consistent with XPS results, there is slightly more gold on the surface than platinum. The ratio of the surface areas is nearly the same as the ratio of the atomic percentages obtained by XPS (e.g. 1.6).

Similar results were also observed from measurements of the non-Faradaic current obtained from CVs recorded in 0.1 M KCl at different scan rates. FIG. 6 inset shows that the non-Faradaic charging current for the 3D-BC—NP—Pt(Au) electrode is significantly higher than that of a planar platinum electrode due to its significantly higher surface area. A plot of the non-Faradaic capacitive current at 0.25 V versus scan rate is linear. Comparison of the slopes of the two electrodes corrected for differences in geometric area indicates that the surface area of 3D-BC—NP—Pt(Au) is 28 times higher than that of the planar electrode.

The high surface area, unique nanostructure and composition of the porous electrodes synthesized herein lend themselves well to applications in the field of electrochemical sensing[45-46] particularly in complex chemical environments. Because the nanostructure is very similar to nanoporous gold,[28] it exhibits unique biofouling resilient properties and allows electrochemical measurements to be made in biofouling solutions. It also improves electron transfer of kinetically slow redox couples due to the nano-confinement effect.[46-47] Moreover, the nanoengineered hierarchical pores in 3D-BC—NP—Pt(Au) electrodes can provide enhanced mass transport via the relatively large semicircular pores and the nano-cracks. In this work, sample A was chosen to examine the electrochemical properties of the 3D-BC—NP—Pt(Au) films.

The CV response of [Fe(CN)$_6$]$^{3-}$ at 3D-BC—NP—Pt(Au) is shown in FIG. 7A. As can be seen, the CVs displayed a well-defined redox peaks characteristic of a quasi-reversible diffusing monoelectronic redox system [Fe(CN)$_6$]$^{3-}$. The peak current is directly proportional to the square root of scan rate (v) and the peak splitting ranged from ~80 to 120 mV over a sweep rate range of 10-100 mV/s. When compared to the results obtained at a planar Pt electrode, the slopes of $i_p$ vs $v^{1/2}$ plot are almost identical (inset in FIG. 7A). As is evident for most nanoporous electrodes, not all the surface area is used when a kinetically fast redox couple is employed due to the prompt consumption of the electroactive redox species at outer pore interface, which prohibits the use of the inner 3D porous network.[46]

These experiments were repeated using a kinetically slower redox species, specifically ascorbic acid (AA) in PBS (0.1M, 0.1 M KCl, pH 7.4). FIG. 7B shows the CVs for the oxidation of ascorbic acid on planar Pt and 3D-BC—NP—Pt(Au). In contrast to that observed for [Fe(CN)$_6$]$^{3-}$, the CV consists of a single peak at 0.292 V and 0.025 V for planar Pt and 3D-BCNP—Pt(Au), respectively. The CV is consistent with a chemically irreversible redox couple. The large positive shift in the peak potential indicates that AA is easier to oxidize on 3D-BC—NPPt(Au), which has also been noted for other nanostructured electrodes[48-49] and attributed to the nano-confinement effect.

Electrochemistry in Biofouling Solutions. One unique aspect associated with the electrode morphology is the presence of a continuous array of nanopores with diameters in the 10's nanometer range, similar to that shown for nanoporous gold.[28-40] Because of this unique geometrical arrangement of nanopores, the surface can act like a bio-sieving membrane and allow for efficient electron transfer between a redox species in solution and the electrode surface even in the presence of biofouling proteins.[29-31] To test this hypothesis, the voltammetry of potassium ferricyanide was evaluated at 3D-BC—NP—Pt(Au) (set of 3 electrodes) and planar Pt electrodes simultaneously in the absence and presence of fibrinogen as a fouling agent. Results on planar and nanoporous gold have been previously shown.[29, 31] FIGS. 8A-B show the CVs of [Fe(CN)$_6$]$^{3-}$ in 0.1 M phosphate buffer (pH 7.4, 0.1 M KCl) before and after the addition of fibrinogen (1.0 mg/mL) at planar and 3D-BC—NP—Pt(Au) electrodes, respectively. At the planar Pt electrode, surface passivation (biofouling) is noted immediately upon addition of fibrinogen by the loss of Faradaic redox activity. In contrast, at 3D-BC—NP—Pt(Au), no significant change in the voltammetric behavior of [Fe(CN)$_6$]$^{3-}$ was observed after addition of fibrinogen. The peak splitting remains at 124 mV and minimal change in the Faradaic peak current was observed over ~22 h time period.

To better see the change in Faradaic current of [Fe(CN)$_6$]$^{3-}$ following addition of fibrinogen, the current at ~138 mV was measured and plotted vs time after addition of fibrinogen. Again, a significant drop in current took place at the planar Pt electrode due to the adsorption of the fibrinogen molecules (electrode fouling) while only a 8.3% drop was observed at 3D-BC—NPPt(Au) after immersion for 60 min. Interestingly, the peak current ratio of [Fe(CN)$_6$]$^{3-}$ at 3D-BCNP—Pt(Au) remained at 1 during the course of this experiment. The fast and efficient electron transfer between the nanoporous Pt(Au) electrode and the [Fe(CN)$_6$]$^{3-}$ ions in the solution is attributed to the unique microstructure, nanoscale features and biosieving-like behavior of the 3D-BC—NP—Pt(Au) nanoporous electrode. These results are very similar to those collected on nanoporous gold electrodes prepared by dealloying 12K gold leaf, which has a similar pore arrangement.[29] The 3D-BC—NP—Pt(Au) electrode, however, is an ideal alternative to NPG for those electroactive species that are more easily oxidized on Pt than Au.

Conclusions

In summary, a new electrosynthetic approach for the fabrication of Pt—Ag bimetallic thin films by the co-electrodeposition of [Ag(CN)$_2$]$^-$ and [PtCl$_4$]$^{2-}$ complex ions on a conductive gold substrate at ambient conditions has been developed. These new materials lead to the formation of 3D bicontinuous nanoporous platinum-based electrodes by selectively removing the silver. As a result of their unique morphology and micostructural features, these platinum-based electrodes have a high and tunable surface area and biofouling resilient properties. The electrochemically assisted synthesis strategy for 3D bicontinuous porous platinum-based structures is simple, reproducible, time and cost effective where very low platinum concentrations in the mmole range are required. These merits make the developed electrosynthesis strategy a promising candidate for large scale production. These interesting findings coupled with the unique structural features of the 3D bicontinuous nanoporous platinum thin films and ease of fabricating, make them useful platforms for many technological applications including high power outputs fuel cells, battery-like supercapacitors, energy storage, drug delivery vehicles, electrochemical sensing in a complex matrix, catalysis, and electrocatalysis.

Example 2

The electrochemical properties of the Pt—Au alloy thin films as prepared in Example 1 were examined in various solutions including electrolytes, methanol, biologically important redox molecules, and solutions containing biofouling agents. These materials showed very high volumetric capacitance, high catalytic activity toward methanol electro-oxidation, and the ability to make electrochemical measurements in biofouling solutions. It was also demonstrated that these electrodes are able to quantitatively oxidize hydrogen peroxide, which is a particularly important bioanalytical reagent. Some of these results can be found in Example 1 with additional experiments provided herein.

Methanol oxidation: applicable to the development of fuel cells. Two well-defined peaks characteristic of methanol oxidation are observed in FIG. 9. The symmetric anodic peak in the forward scan corresponds to the oxidation of freshly adsorbed methanol. This peak shifted positive from −294 mV on planar platinum to −178 mV on 3D-BC—NP—Pt(Au). This significant shift to more positive potentials can be attributed to the high surface area, nanoscale features, large number of active sites and the enhanced mass transport through the porous network which facilitates/catalyzes methanol oxidation. During the reverse scan, an anodic oxidation current peak around −0.4 volts was recorded. This peak is attributed to the removal of the incompletely oxidized carbonaceous organic intermediates formed on the electrode surface during the forward potential sweep. The high tolerance of the 3D-BC—NP—Pt(Au) toward the accumulation of carbonaceous organic residues on the electrode surface is pronounced in its very high $I_f/I_b$ ratio ~19 where $I_f$ and $I_p$ are the forward and reverse anodic peak current densities, respectively. This ratio is 4 times larger than that noted on planar Pt. The ratio $(I_f)$ NP—Pt(Au)/$(I_f)$ planar-Pt is 30, demonstrating that the rate of methanol oxidation at 3D-BC—NP—Pt(Au) electrode is 30 times higher than that at planar platinum. The bimetallic composite electrode also has a very low catalyst loading, which is important in technological applications. These findings demonstrate that the 3D-BC—NP—Pt(Au) catalyst can overcome the sluggish kinetics of methanol electro-oxidation and can be applied in high current outputs direct methanol fuel cells.

Chemical sensing: Hydrogen Peroxide ($H_2O_2$). FIG. 10 shows cyclic voltammograms obtained for hydrogen peroxide using planar Pt, 3D-BC—NP—Pt(Au) and nanoporous gold (NPG) electrodes. Nanoporous gold electrodes cannot reduce hydrogen peroxide due to slow electron transfer kinetics while 3D-BC—NP—Pt(Au) electrodes are able to. Furthermore the peak potential shifts positive by more than 200 mV indicating that it is much easier to reduce hydrogen peroxide on nanoporous 3D-BC—NP—Pt(Au) compared to planar platinum.

Cyclic voltammograms were obtained for hydrogen peroxide before and after 1 h of exposure to bovine serum albumin (BSA), a known biofouling agent, using planar Pt (FIG. 11A) and 3D-BC—NP—Pt(Au) (FIG. 11B) electrodes. FIG. 11C shows the average current densities recorded for hydrogen peroxide using 3D-BC—NP—Pt (Au)) before and after exposure to BSA. The significant decrease in current observed at planar platinum after addition of BSA is indicative of biofouling and the subsequent loss of the electrochemical response. On 3D-BC—NP—Pt (Au), however, minimum loss in the electrochemical signal is observed.

REFERENCES

1. Guo, Y. G.; Hu, J. S.; Wan, L. J. Nanostructured materials for electrochemical energy conversion and storage devices. *Advanced Materials* 2008, 20 (15), 2878-2887.
2. Zhang, J. T.; Li, C. M. Nanoporous metals: fabrication strategies and advanced electrochemical applications in catalysis, sensing and energy systems. *Chemical Society Reviews* 2012, 41 (21), 7016-7031.
3. Guo, D. J.; Ding, Y. Porous nanostructured metals for electrocatalysis. *Electroanalysis* 2012, 24 (11), 2035-2043.
4. Chen, A.; Holt-Hindle, P. Platinum-based nanostructured materials: synthesis, properties, and applications. *Chem. Rev* 2010, 110 (6), 3767-3804.
5. Kloke, A.; von Stetten, F.; Zengerle, R.; Kerzenmacher, S. Strategies for the Fabrication of Porous Platinum Electrodes. *Advanced Materials* 2011, 23 (43), 4976-5008.
6. Lai, J.; Luque, R.; Xu, G. Recent Advances in the Synthesis and Electrocatalytic Applications of Platinum-Based Bimetallic Alloy Nanostructures. *ChemCatChem* 2015, 7 (20), 3206-3228.
7. Xu, Y.; Zhang, B. Recent advances in porous Pt-based nanostructures: synthesis and electrochemical applications. *Chemical Society Reviews* 2014, 43 (8), 2439-2450.
8. Zhu, C.; Du, D.; Eychmueller, A.; Lin, Y. Engineering Ordered and Nonordered Porous Noble Metal Nanostructures: Synthesis, Assembly, and Their Applications in Electrochemistry. *Chemical Reviews* 2015, 115 (16), 8896-8943.
9. Attard, G. S.; Bartlett, P. N.; Coleman, N. R.; Elliott, J. M.; Owen, J. R.; Wang, J. H. Mesoporous platinum films from lyotropic liquid crystalline phases. *Science* 1997, 278 (5339), 838-840.
10. Elliott, J. M.; Attard, G. S.; Bartlett, P. N.; Coleman, N. R.; Merckel, D. A.; Owen, J. R. Nanostructured platinum (HI-ePt) films: effects of electrodeposition conditions on film properties. *Chemistry of materials* 1999, 11 (12), 3602-3609.
11. Park, S.; Park, S.; Jeong, R.-A.; Boo, H.; Park, J.; Kim, H. C.; Chung, T. D. Nonenzymatic continuous glucose monitoring in human whole blood using electrified nanoporous Pt. *Biosensors and Bioelectronics* 2012, 31 (1), 284-291.
12. Bartlett, P.; Baumberg, J.; Birkin, P. R.; Ghanem, M.; Netti, M. Highly ordered macroporous gold and platinum films formed by electrochemical deposition through templates assembled from submicron diameter monodisperse polystyrene spheres. *Chemistry of Materials* 2002, 14 (5), 2199-2208.
13. Park, S.; Song, Y. J.; Boo, H.; Han, J.-H.; Chung, T. D. Arrayed hybrid nanoporous Pt pillars. *Electrochemistry Communications* 2009, 11 (11), 2225-2228.
14. Liu, W.; Herrmann, A.-K.; Bigall, N. C.; Rodriguez, P.; Wen, D.; Oezaslan, M.; Schmidt, T. J.; Gaponik, N.; Eychmueller, A. Noble Metal Aerogels-Synthesis, Characterization, and Application as Electrocatalysts. *Accounts of Chemical Research* 2015, 48 (2), 154-162.
15. Bigall, N. C.; Herrmann, A. K.; Vogel, M.; Rose, M.; Simon, P.; Carrillo-Cabrera, W.; Dorfs, D.; Kaskel, S.; Gaponik, N.; Eychmuller, A. Hydrogels and aerogels from noble metal nanoparticles. *Angewandte Chemie International Edition* 2009, 48 (51), 9731-9734.
16. Nahar, L.; Farghaly, A. A.; Esteves, R. J. A.; Arachchige, I. U. Shape Controlled Synthesis of Au/Ag/Pd Nanoalloys and Their Oxidation-Induced Self-Assembly into Electrocatalytically Active Aerogel Monoliths. *Chemistry of Materials* 2017, 29 (18), 7704-7715.
17. McCue, I.; Benn, E.; Gaskey, B.; Erlebacher, J. Dealloying and dealloyed materials. *Annual Review of Materials Research* 2016, 46, 263-286.

18. Kloke, A.; Kohler, C.; Gerwig, R.; Zengerle, R.; Kerzenmacher, S. Cyclic electrodeposition of PtCu alloy: facile fabrication of highly porous platinum electrodes. *Advanced Materials* 2012, 24 (21), 2916-2921.
19. Pugh, D. V.; Dursun, A.; Corcoran, S. G. Formation of nanoporous platinum by selective dissolution of Cu from Cu0.75Pt0.25. *Journal of Materials Research* 2003, 18 (1), 216-221.
20. Kim, S. H.; Choi, J. B.; Nguyen, Q. N.; Lee, J. M.; Park, S.; Chung, T. D.; Byun, J. Y. Nanoporous platinum thin films synthesized by electrochemical dealloying for non-enzymatic glucose detection. *Physical Chemistry Chemical Physics* 2013, 15 (16), 5782-5787.
21. Jung, H. Y.; Kim, D. H.; Chun, H. K.; Kim, S. H.; Lim, C. S.; Byun, J. Y.; Jung, Y. J. Towards Engineering Nanoporous Platinum Thin Films for Highly Efficient Catalytic Applications. *Advanced Energy Materials* 2011, 1 (6), 1126-1132.
22. Xu, J.; Zhang, C.; Wang, X.; Ji, H.; Zhao, C.; Wang, Y.; Zhang, Z. Fabrication of bimodal nanoporous bimetallic Pt—Au alloy with excellent electrocatalytic performance towards formic acid oxidation. *Green Chemistry* 2011, 13 (7), 1914-1922.
23. Vega, A. A.; Newman, R. C. Nanoporous metals fabricated through electrochemical dealloying of Ag—Au—Pt with systematic variation of Au: Pt ratio. *Journal of the Electrochemical Society* 2014, 161 (1), C1-C10.
24. Snyder, J.; Asanithi, P.; Dalton, A. B.; Erlebacher, J. Stabilized nanoporous metals by dealloying ternary alloy precursors. *Advanced Materials* 2008, 20 (24), 4883-4886.
25. Vega, A. A.; Newman, R. C. Beneficial effects of adsorbate-induced surface segregation of Pt in nanoporous metals fabricated by dealloying of Ag—Au—Pt alloys. *Journal of The Electrochemical Society* 2014, 161 (1), C11-C19.
26. Qi, Z.; Vainio, U.; Kornowski, A.; Ritter, M.; Weller, H.; Jin, H.; Weissmuller, J. Porous Gold with a Nested-Network Architecture and Ultrafine Structure. *Advanced Functional Materials* 2015, 25 (17), 2530-2536.
27. Jin, H. J.; Kramer, D.; Ivanisenko, Y.; Weissmuller, J. Macroscopically strong nanoporous Pt prepared by dealloying. *Advanced Engineering Materials* 2007, 9 (10), 849-854.
28. Collinson, M. M. Nanoporous Gold Electrodes and Their Applications in Analytical Chemistry. *ISRN Analytical Chemistry* 2013, 2013, 21.
29. Patel, J.; Radhakrishnan, L.; Zhao, B.; Uppalapati, B.; Daniels, R. C.; Ward, K. R.; Collinson, M. M. Electrochemical Properties of Nanostructured Porous Gold Electrodes in Biofouling Solutions. *Analytical Chemistry* 2013, 85 (23), 11610-11618.
30. Serrano, M. B.; Despas, C.; Herzog, G.; Walcarius, A. Mesoporous silica thin films for molecular sieving and electrode surface protection against biofouling. *Electrochemistry Communications* 2015, 52, 34-36.
31. Farghaly, A. A.; Lam, M.; Freeman, C. J.; Uppalapati, B.; Collinson, M. M. Potentiometric Measurements in Biofouling Solutions: Comparison of Nanoporous Gold to Planar Gold. *Journal of The Electrochemical Society* 2016, 163 (4), H3083-H3087.
32. Daggumati, P.; Matharu, Z.; Wang, L.; Seker, E. Biofouling-Resilient Nanoporous Gold Electrodes for DNA Sensing. *Analytical Chemistry* 2015, 87 (17), 8618-8622.
33. Park, S.; Boo, H.; Chung, T. D. Electrochemical non-enzymatic glucose sensors. *Analytica chimica acta* 2006, 556 (1), 46-57.
34. Weissmuller, J.; Newman, R. C.; Jin, H.-J.; Hodge, A. M.; Kysar, J. W. Nanoporous metals by alloy corrosion: formation and mechanical properties. *Mrs Bulletin* 2009, 34 (8), 577-586.
35. Sieradzki, K.; Newman, R. C. Stress-corrosion Cracking. *Journal of Physics and Chemistry of Solids* 1987, 48 (11), 1101-1113.
36. Rao, C. R. K.; Trivedi, D. C. Chemical and electrochemical depositions of platinum group metals and their applications. *Coordination Chemistry Reviews* 2005, 249 (5-6), 613-631.
37. Alia, S. M.; Zhang, G.; Kisailus, D.; Li, D.; Gu, S.; Jensen, K.; Yan, Y. Porous Platinum Nanotubes for Oxygen Reduction and Methanol Oxidation Reactions. *Advanced Functional Materials* 2010, 20 (21), 3742-3746.
38. Hill, J. W.; Petrucci, R. H.; Mosher, M. D. *General chemistry*; Pearson Prentice Hall Upper Saddle River, NJ 2005.
39. Kurtulus, O.; Daggumati, P.; Seker, E. Molecular release from patterned nanoporous gold thin films. *Nanoscale* 2014, 6 (12), 7062-7071.
40. Seker, E.; Reed, M. L.; Begley, M. R. Nanoporous Gold: Fabrication, Characterization, and Applications. *Materials* 2009, 2 (4), 2188-2215.
41. Kim, K. S.; Winograd, N.; Davis, R. E. Electron spectroscopy of platinum-oxygen surfaces and application to electrochemical studies. *Journal of the American Chemical Society* 1971, 93 (23), 6296-6297.
42. Farghaly, A. A.; Collinson, M. M. Electroassisted codeposition of sol-gel derived silica nanocomposite directs the fabrication of coral-like nanostructured porous gold. *Langmuir* 2014, 30(18), 5276-5286.
43. Erlebacher, J. An atomistic description of dealloying—Porosity evolution, the critical potential, and rate-limiting behavior. *Journal of the Electrochemical Society* 2004, 151 (10), C614-C626.
44. Trasatti, S.; Petrii, O. Real surface area measurements in electrochemistry. *Pure and applied chemistry* 1991, 63 (5), 711-734.
45. Qiu, H.-J.; Li, X.; Xu, H.-T.; Zhang, H.-J.; Wang, Y. Nanoporous metal as a platform for electrochemical and optical sensing. *Journal of Materials Chemistry* C 2014, 2 (46), 9788-9799.
46. Park, S.; Kim, H. C.; Chung, T. D. Electrochemical analysis based on nanoporous structures. *Analyst* 2012, 137 (17), 3891-3903.
47. Bae, J. H.; Han, J.-H.; Han, D.; Chung, T. D. Effects of adsorption and confinement on nanoporous electrochemistry. *Faraday discussions* 2013, 164, 361-376.
48. Qiu, H.-J.; Zhou, G.-P.; Ji, G.-L.; Zhang, Y.; Huang, X.-R.; Ding, Y. A novel nanoporous gold modified electrode for the selective determination of dopamine in the presence of ascorbic acid. *Colloids and Surfaces B: Biointerfaces* 2009, 69 (1), 105-108.
49. El-Said, W. A.; Lee, J.-H.; Oh, B.-K.; Choi, J.-W. 3-D nanoporous gold thin film for the simultaneous electrochemical determination of dopamine and ascorbic acid. *Electrochemistry Communications* 2010, 12 (12), 1756-1759.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of preparing a nanoporous three-dimensional bicontinuous Pt—Au electrode, comprising the steps of:
co-electrodepositing Pt and Ag to form a Pt—Ag binary alloy thin film on a gold substrate,
annealing the Pt—Ag binary alloy thin film deposited on the gold substrate to produce a Pt—Ag—Au alloy, and
dealloying the Pt—Ag—Au alloy by dissolving Ag to produce the Pt—Au electrode.

2. The method of claim 1, wherein a plating solution for the co-electrodeposition contains $[PtCl_4]^{2-}$ ions.

3. The method of claim 1, wherein a plating solution for the co-electrodeposition contains $[Ag(CN)_2]^-$ ions.

4. The method of claim 1, wherein the dealloying step is performed in nitric acid.

5. The method of claim 1, wherein the method is performed in the absence of surfactant.

* * * * *